(12) United States Patent
Lai

(10) Patent No.: US 7,913,859 B2
(45) Date of Patent: Mar. 29, 2011

(54) SELF-CLEANING LIGHT SOURCE MODULE

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/712,214

(22) Filed: Feb. 25, 2010

(65) Prior Publication Data

US 2010/0149793 A1    Jun. 17, 2010

Related U.S. Application Data

(62) Division of application No. 12/146,866, filed on Jun. 26, 2008.

(30) Foreign Application Priority Data

Sep. 14, 2007   (CN) .......................... 2007 1 0201709

(51) Int. Cl.
*C02F 1/50* (2006.01)
*F21V 9/00* (2006.01)

(52) U.S. Cl. ........................... 210/501; 96/224; 362/231

(58) Field of Classification Search .................. 362/617, 362/618, 602; 62/264; 96/224, 226; 210/501
See application file for complete search history.

(56) References Cited

U.S. PATENT DOCUMENTS

| | | | | |
|---|---|---|---|---|
| 5,919,422 | A * | 7/1999 | Yamanaka et al. | 422/121 |
| 6,675,425 | B1 * | 1/2004 | Iimura | 15/105 |
| 2007/0230181 | A1 * | 10/2007 | Fujishima et al. | 362/293 |
| 2008/0142435 | A1 * | 6/2008 | Kawai et al. | 210/501 |
| 2008/0236183 | A1 * | 10/2008 | Iimura | 62/264 |
| 2008/0259611 | A1 * | 10/2008 | Mangiardi | 362/311 |

FOREIGN PATENT DOCUMENTS

JP        2005-330284        * 11/2005

* cited by examiner

*Primary Examiner* — John A Ward
(74) *Attorney, Agent, or Firm* — Frank R. Niranjan

(57) ABSTRACT

An exemplary self-cleaning light source module includes a light source assembly, a housing, and a photocatalyst layer. The light source assembly includes a first light emitting component for emitting visible light and a second light emitting component for emitting UV light. The housing encloses the light source assembly therein and has a light permeable portion. The photocatalyst layer is formed on an outer surface of the light permeable portion of the housing.

2 Claims, 4 Drawing Sheets

SELF-CLEANING LIGHT SOURCE MODULE

CROSS-REFERENCE TO RELATED APPLICATION

This patent application is a divisional application of patent application Ser. No. 12/146,866, filed on Jun. 26, 2008, entitled "SELF-CLEANING LIGHT SOURCE MODULE", assigned to the same assignee, and disclosure of which is incorporated herein by reference in its entirety.

BACKGROUND

1. Technical Field

The present invention relates to a light source module and, particularly, to self-cleaning light source modules.

2. Discussion of Related Art

Nowadays, various of light source modules have been widely used in daily life. In use, contaminants such as organic dirt, may accumulate on outer surfaces of the light source modules and block the light emitted therefrom. As a result, brightness of the light source modules is greatly decreased. So it is necessary to clean the light source modules regularly. However, the light source modules are generally mounted at a high position, for example, on the ceiling. Therefore, it is quite inconvenient to clean the light source modules.

Therefore, a new self-cleaning light source module is desired to overcome the above mentioned problems.

SUMMARY

An exemplary self-cleaning light source module includes a light source assembly, a housing, and a photocatalyst layer. The light source assembly includes a first light emitting component for emitting visible light and a second light emitting component for emitting UV light. The housing encloses the light source assembly therein and has a light permeable portion. The photocatalyst layer is formed on an outer surface of the light permeable portion of the housing.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments will now be described in detail below with reference to the drawings. In the present embodiment, a self-cleaning light source module 10 is used as an outdoor lamp.

Figure 1:
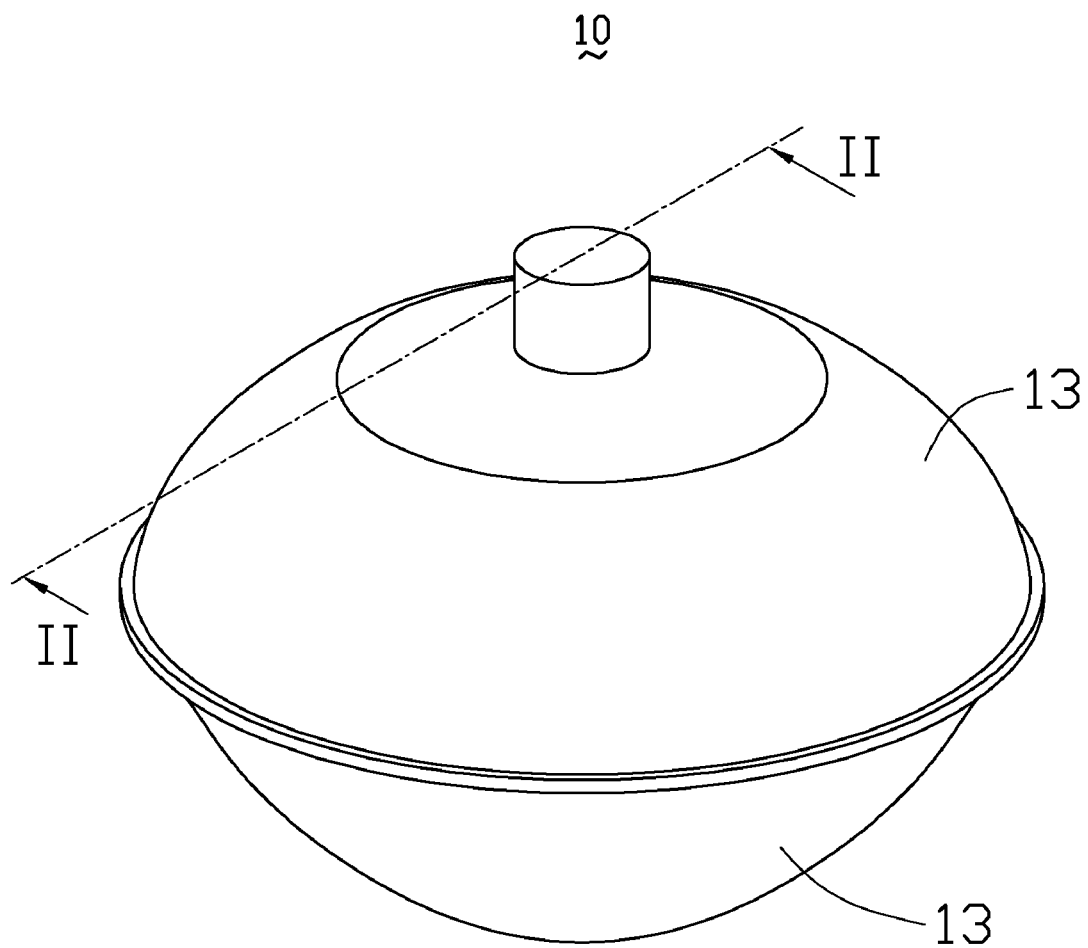
FIG. 1 is a schematic, perspective view of a self-cleaning light source module according to a first embodiment of the present invention.
Figure 2:
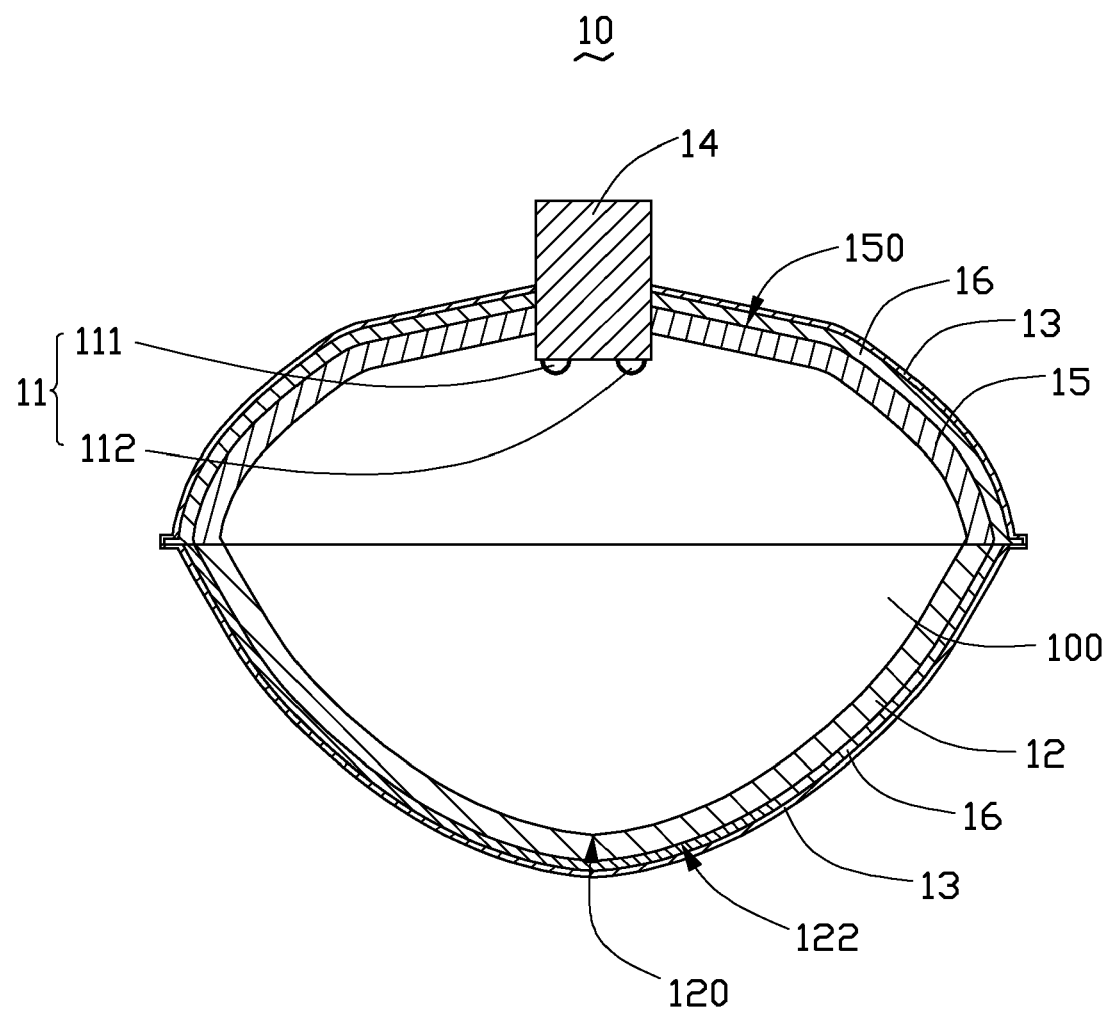
FIG. 2 is a schematic, side cross-sectional view of the self-cleaning light source module of FIG. 1 taken along the line II-II thereof.

Referring to FIGS. 1 and 2, the self-cleaning light source module 10 of a first embodiment is shown. The self-cleaning light source module 10 includes a light source assembly 11, a light permeable layer 12 functioned as a lampshade, and a photocatalyst layer 13.

The light source assembly 11 includes at least one first light emitting component 111 and at least one second light emitting component 112. The first light emitting component 111 is configured for emitting visible light, and the second light emitting component 112 is configured for emitting ultraviolet (UV) light. The first light emitting component 111 can be a white light emitting diode (LED), and the second light emitting component 112 can be an ultraviolet LED. The light source assembly 11 can further include other light emitting components, such as an incandescent light or a fluorescent light. The light source assembly 11 is electrically mounted on a circuit board 14.

The light permeable layer 12 is optically coupled with the light source assembly 11. The light permeable layer 12 allows the visible light and the UV light to pass therethrough. The light permeable layer 12 includes a light incident surface 120 and a light emitting surface 122. The self-cleaning light source module 10 further includes a cover 15. The cover 15 and the light permeable layer 12 cooperatively form a housing of the light source module 10, and define a space 100 therebetween. The space 100 is configured for accommodating the light source assembly 11. The cover 15 and the light permeable layer 12 cooperatively prevent/protect the light source assembly 11 from contaminations. The light permeable layer 12 can be made of polymethylmethacrylate (PMMA), polycarbonate (PC), glass, or silicone.

The photocatalyst layer 13 is formed on the light emitting surface 122 of the light permeable layer 12. The photocatalyst layer 13 is made of photocatalyst material, such as titanium dioxide ($TiO_2$), and zinc oxide ($ZnO_x$). Compared to other photocatalyst materials, the titanium dioxide has higher photocalytic property, more stable chemical property, and less toxicity. In the present embodiment, the photocatalyst layer 13 is made of titanium dioxide.

Contaminants, such as organic dirt, may easily accumulate on the photocatalyst layer 13 of the light emitting surface 122 of the light permeable layer 12. It should be noted that the photocatalyst layer 13 can further be formed on a surface 150 of the cover 15.

To avoid chemical reaction occurring between the photocatalyst layer 13 and the light permeable layer 12, a transparent intermediate layer 16 is sandwiched between the light permeable layer 12 and the photocatalyst layer 13. Likewise, another transparent intermediate layer 16 is also sandwiched between the cover 15 and the photocatalyst layer 13. In the present embodiment, there are two transparent intermediate layers 16. The transparent intermediate layers 16 can be made of a transparent material, such as silicon oxide ($SiO_2$), aluminum oxide ($Al_xO_y$), and silicon nitride ($SiN_x$).

The second emitting element 112 emits UV light; the UV light passes through the light permeable layer 12 and the transparent intermediate layer 16, and then reaches the photocatalyst layer 13. When exposed to the UV light, the photocatalyst layer 13 reacts with molecules of water and oxygen on the surface of the photocatalyst layer 13. A plurality of free radicals, such as hydroxyl ions ($OH^-$), superoxide ions ($O_2^-$) are produced by such reactions. The free radicals contain strong reductive and oxidative capabilities. Thus, most of contaminants on a surface of the photocatalyst layer 13 are broken down by the free radicals, and the photocatalyst layer 13 is made superhydrophilic. Subsequently, rain easily washes away the contaminants from the photocatalyst layer 13. In this way, most of the contaminants are removed from the light source module 10, and the brightness of the light source module 10 is maintained. Therefore, it is not necessary to manually clean the light source module 10.

Generally, the cover 15 is made of opaque material. Hence, most of the UV light emitted by the second light emitting component 112 can not pass through the cover 15 and reach the photocatalyst layer 13 formed on the cover 15. However, since the self-cleaning light source module 10 is used outdoors, during daytime the photocatalyst layer 13 formed on the cover 15 absorbs UV light in sunlight and cleans contaminants formed thereon. Likewise, during daytime the photocatalyst layer 13 formed on the light permeable layer 12 absorbs UV light in sunlight and cleans contaminants formed thereon.

The photocatalyst layer 13 is made of titanium dioxide with a band gap of 3.2 electron-volts (eV). In order to activate the photocatalyst layer 13, UV light with a wavelength less than 387 nanometers (nm) is used. Because all the UV light with a wavelength less than 387 nm is absorbed by the photocatalyst layer 13, the UV light with a wavelength less than 387 nm can not transmit through the photocatalyst layer 13. In this way, the UV light with a wavelength less than 387 nm is limited within the light source module 10, so that the UV light does not do any harm to human beings.

Figure 3:
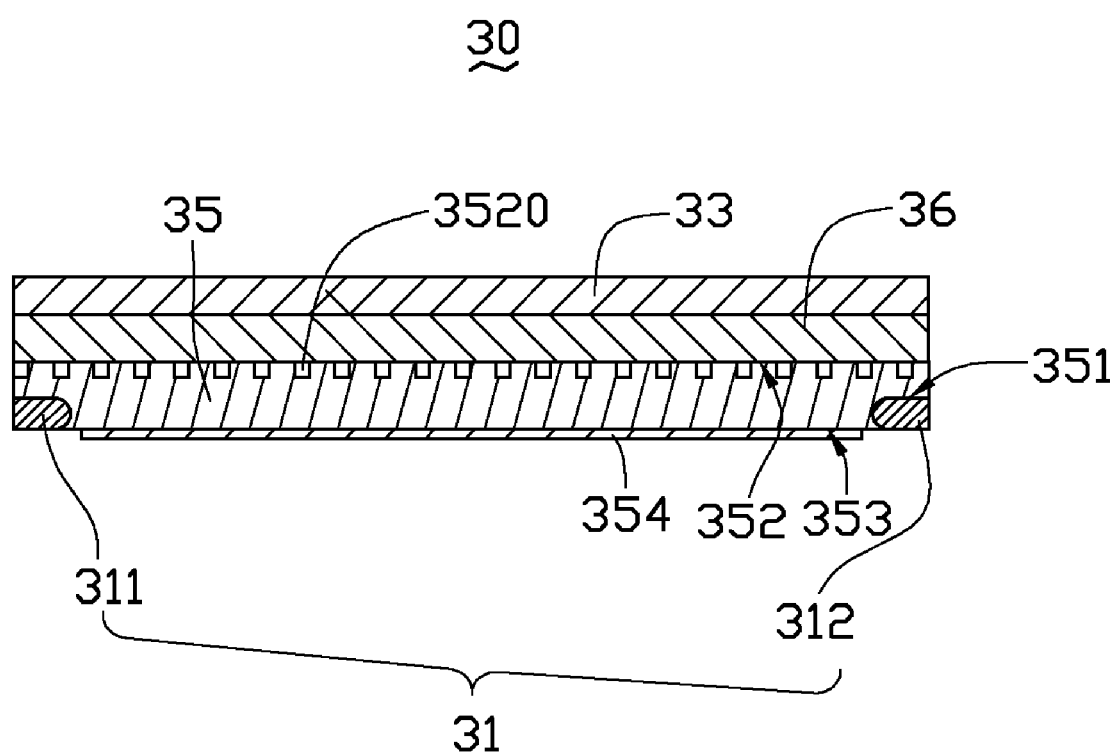
FIG. 3 is a schematic, side cross-sectional view of the self-cleaning light source module according to a second embodiment of the present invention.

Referring to FIG. 3, a self-cleaning planar light source module 30 of a second embodiment is shown. The self-cleaning planar light source module 30 includes a light source assembly 31, a light guide plate 35, a reflective film 354, a transparent intermediate layer 36, and a photocatalyst layer 33.

The light guide plate 35 has a plurality of recesses defined at the edges (not labeled) thereof. The recesses are configured for receiving the light source assembly 31 therein. The light guide plate 35 includes two light incident surfaces 351, a light emitting surface 352, a bottom surface 353 opposite to the light emitting surface 352. The light guide plate 35 can be made of polymethylmethacrylate (PMMA), polycarbonate (PC), glass, or silicone. The light guide plate 35 has a plurality of micro-structures 3520 (e.g., recesses) formed on the light emitting surface 352. The micro-structures 3520 are configured for increasing the brightness of the light emitting surface 352.

The light source assembly 31 includes a first light emitting component 311 and a second light emitting component 312. The first light emitting component 311 is configured for emitting visible light, and the second light emitting component 312 is configured for emitting UV light. The transparent intermediate layer 36 is formed on the light emitting surface 352 of the light guide plate 35. The photocatalyst layer 33 is formed on the transparent intermediate layer 36. The reflective film 354 is formed on the bottom surface 353 and configured for enhancing the brightness of the light emitting surface 352.

Figure 4:
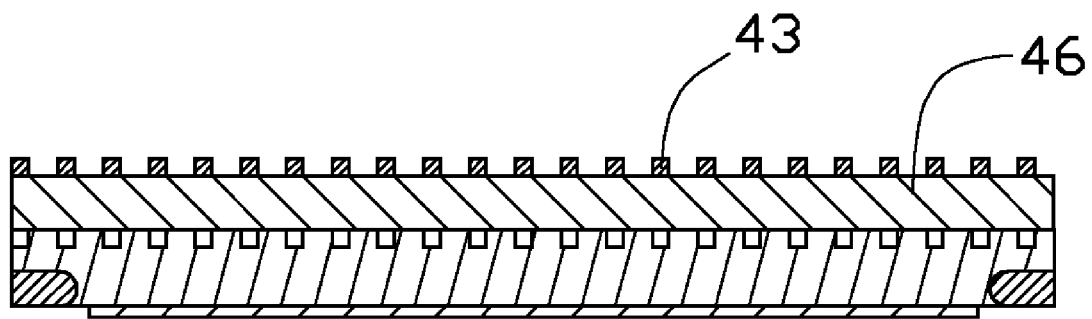
FIG. 4 is a schematic, side cross-sectional view of the self-cleaning light source module according to a third embodiment of the present invention.

Referring to FIG. 4, a self-cleaning planar light source module 40 of a third embodiment is shown. The self-cleaning planar light source module 40 includes a photocatalyst layer 43 and a transparent layer 46. The self-cleaning planar light source module 40 is similar to the self-cleaning planar light source module 30 of the second embodiment. However, in the self-cleaning planar light source module 40, the photocatalyst layer 43 is a patterned layer and is made of photocatalyst particles. The photocatalyst particles can be in an approximate range from 1 nanometer to 1000 microns. Hence, a contacting area between the photocatalyst layer 43 and contaminants is increased, and an area for absorbing UV light is also increased. As a result, the cleaning ability of the photocatalyst layer 43 is increased.

The transparent intermediate layer 46 is made of the mixture of PMMA and silicon dioxide. Hence, the photocatalyst layer 43 is firmly adhered to the transparent intermediate layer 16. Accordingly, the self-cleaning planar light source module 40 is more durable.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A self-cleaning light source module, comprising:
    a light source assembly comprising a first light emitting component for emitting visible light and a second light emitting component for emitting UV light;
    a housing enclosing the light source assembly therein, the housing having a light permeable portion;
    a photocatalyst layer formed on an outer surface of the light permeable portion of the housing; and
    a transparent intermediate layer sandwiched between the light permeable portion of the housing and the photocatalyst layer, the transparent intermediate layer configured for allowing both the visible light and the UV light to pass therethrough.

2. The self-cleaning light source module as claimed in claim 1, wherein the transparent intermediate layer is comprised of silicon oxide, aluminum oxide, silicon nitride, or PMMA.

* * * * *